(12) United States Patent
Mun

(10) Patent No.: US 6,405,428 B1
(45) Date of Patent: Jun. 18, 2002

(54) APPARATUS OF AUTOMATICALLY ASSEMBLING A HEAT EXCHANGER

(75) Inventor: Heung-Gi Mun, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 49 days.

(21) Appl. No.: 09/593,421

(22) Filed: Jun. 14, 2000

(30) Foreign Application Priority Data

Sep. 8, 1999 (KR) ............................................ 99-38152

(51) Int. Cl.[7] ................................................. B23P 15/00
(52) U.S. Cl. ........................ 29/726; 29/33 G; 29/33 T
(58) Field of Search ...................... 29/726, 727, 33 G, 29/33 T, 890.043

(56) References Cited

U.S. PATENT DOCUMENTS

| | | | | |
|---|---|---|---|---|
| 4,625,378 A | * | 12/1986 | Tanno et al. | 29/727 |
| 4,734,969 A | * | 4/1988 | Currier et al. | 29/726 |
| 4,780,955 A | * | 11/1988 | Stroup | 29/727 |
| 4,836,828 A | * | 6/1989 | York et al. | 29/727 |
| 4,839,950 A | * | 6/1989 | Stroup | 29/727 |
| 5,533,251 A | * | 7/1996 | Vetter | 29/890.043 |
| 5,996,217 A | * | 12/1999 | Tokunaga et al. | 29/727 |
| 6,167,619 B1 | * | 1/2001 | Beagle | 29/890.043 |

* cited by examiner

Primary Examiner—I Cuda-Rosenbaum
(74) Attorney, Agent, or Firm—Robert E. Bushnell, Esq.

(57) ABSTRACT

An automatic assembling apparatus of assembling return bends and hair pins of a heat exchanger is provided. The heat exchanger includes a plurality of flat plat fins arranged spaced-apart from each other by a first predetermined interval, a plurality of hair pins fixed in perpendicular to the flat plat fins with a second predetermined interval, and a plurality of return bends to be fixed at both ends of the hair pins and form a passage of coolant circulating through the hair pins. The apparatus includes a heat exchanger transferring unit for clamping both lateral surfaces of the heat exchanger having the hair pins with flat plat fins connected together and horizontally transferring the heat exchanger and a bend inserting unit installed at one end of the heat exchanger transferring unit for securing the return bends at the hair pins moved to a predetermined position by the heat exchanger transferring unit.

19 Claims, 7 Drawing Sheets

APPARATUS OF AUTOMATICALLY ASSEMBLING A HEAT EXCHANGER

CLAIM OF PRIORITY

This application makes reference to, incorporates the same herein, and claims all benefits accruing under 35 U.S.C. §119 from an application for A AUTOMATIC INSERTION MACHINE FOR RETURN BEND PIPE OF HEAT EXCHANGER earlier filed in the Korean Industrial Property Office on Sep. 8, 1999 and there duly assigned Serial No. 38152/1999.

BACKGROUND OF THE INVENTION

1. Field of the Invention

The present invention relates to an automatic assembling apparatus of automatically assembling return bends and hair pins in a heat exchanger, and more particularly to an automatic assembling apparatus of automatically inserting the return bends into the hair pins mounted in a plurality of flat plate fins in a heat exchanger.

2. Brief Description of the Prior Art

Return bends are inserted into corresponding hair pins for forming a passageway of a coolant circulating the hair pins mounted in the flat plate fins of a heat exchanger. The return bends had been manually arranged with and inserted into the hair pins. This manual assembling process causes misalignment and inaccurate coupling of hair pins and return bends during assembling of a heat exchanger.

As shown in FIG. 1, a heat exchanger 1 generally includes a plurality of flat plate pins 10 arranged in parallel to an air flowing direction and spaced-apart from each other by a first predetermined interval for allowing air to pass through between the flat plate fins, a plurality of hair pins 12 inserted into holes formed on the flat plate fins 10 and mounted in perpendicular to the flat plat fins by a predetermined horizontal interval for allowing coolant to circulate therein, and a plurality of return bends 14 respectively coupled to a pair of ends 12a of the hair pins to form a single coolant pass line.

In a conventional method of inserting return bends 14 to hair pins 12 of the heat exchanger 1, after a plurality of hair pins 12 have been assembled with a plurality of flat plat fins 10, ends 14b of each return bend are manually matched with ends 12a of hair pins 12 and forcibly inserted into ends 12a of hair pins by a rubber hammer by a predetermined length.

However, there has been problems in a conventional method of manually inserting return bends 14 into hair pins 12 and manually assembling the heat exchanger 1 such as inefficiency due to workers' fatigue. Return bends 14 are neither accurately aligned with hair pins 12 nor inserted into hair pins by a uniform length to thereby increase a number of defects and consume a lot of time in assembling the return bends and hair pins. These problems of the conventional method prevent a mass production.

SUMMARY OF THE INVENTION

It is an object of the present invention to provide an automatic assembling apparatus able to automatically and simultaneously assemble a plurality of return bends and a plurality of hair pins in a heat exchanger.

It is another object of the present invention to provide an automatic assembling apparatus able to automatically align the return bend and the hair pin.

It is yet another object to provide an automatic assembling apparatus able to automatically and precisely insert the return bend into the hair pin.

It is still another object to provide an automatic assembling apparatus able to accurately coupling the return bend and the hair pin.

It is a further object to provide an automatic assembling apparatus able to prevent defects on the return bend and the hair pin and the deterioration of the coolant flow passing through the return bend and the hair pin.

It is also object to provide a heat exchanger assembling apparatus able to increase the efficiency of the heat exchanger by reducing assembling time and suitable to a mass production of the heat exchanger.

These and other objects may be achieved by providing an automatic assembling apparatus including a heat exchanger transferring unit clamping both lateral sides of the heat exchanger having the hair pins and flat plat fins and horizontally transferring the heat exchanger on a working station, a bend inserting unit installed at one end of the heat exchanger transferring unit and coupling the return bends into the hair pins, a transferring member installed in rear of a supporting frame for horizontally transferring the heat exchanger, and a clamping member connected to the transferring member and clamping and maintaining the heat exchanger in a predetermined height.

The bend inserting unit includes first and second return bend supplying member installed at both upper ends of a main body and accommodating and supplying the return bends one after another and a bend inserting member installed on a center of a lower end on a front lateral surface of the main body and clamping the return bends respectively supplied from the first and second bend supplying member and coupling return bends to the hair pins.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
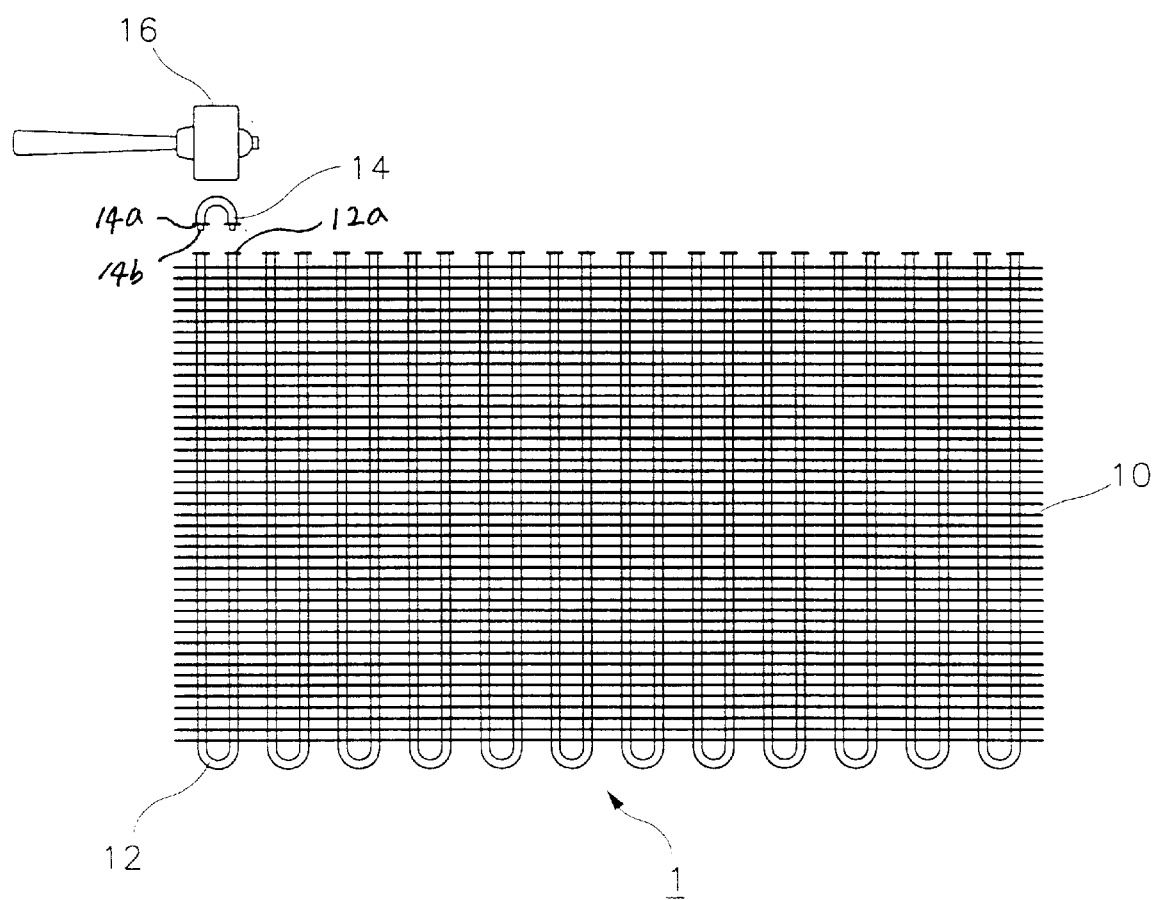
FIG. 1 is a perspective view illustrating a manual process of inserting return bends into hair pins according to the prior art.

Hereinafter a preferred embodiment according to the principle of the present invention will be described in detail with reference to accompanying drawings shown in FIGS. 2 through 8. It should be noted that the same or similar reference numerals of the prior art are used for the same or similar parts in the drawings of the present invention.

An automatic assembling apparatus of assembling return bends and hair pins in the heat exchanger includes a heat exchanger transferring unit 100 clamping both parallel sides of heat exchanger 1 having hair pins 12 and flat plat fins 10 and horizontally transferring the heat exchanger on a working station by a predetermined distance and a bend inserting unit 200 installed on one end of the heat exchanger transferring unit 100 for accurately arranging return bends 14 and hair pins 12 and securely inserting return bends 14 into hair pins 12.

Figure 2:
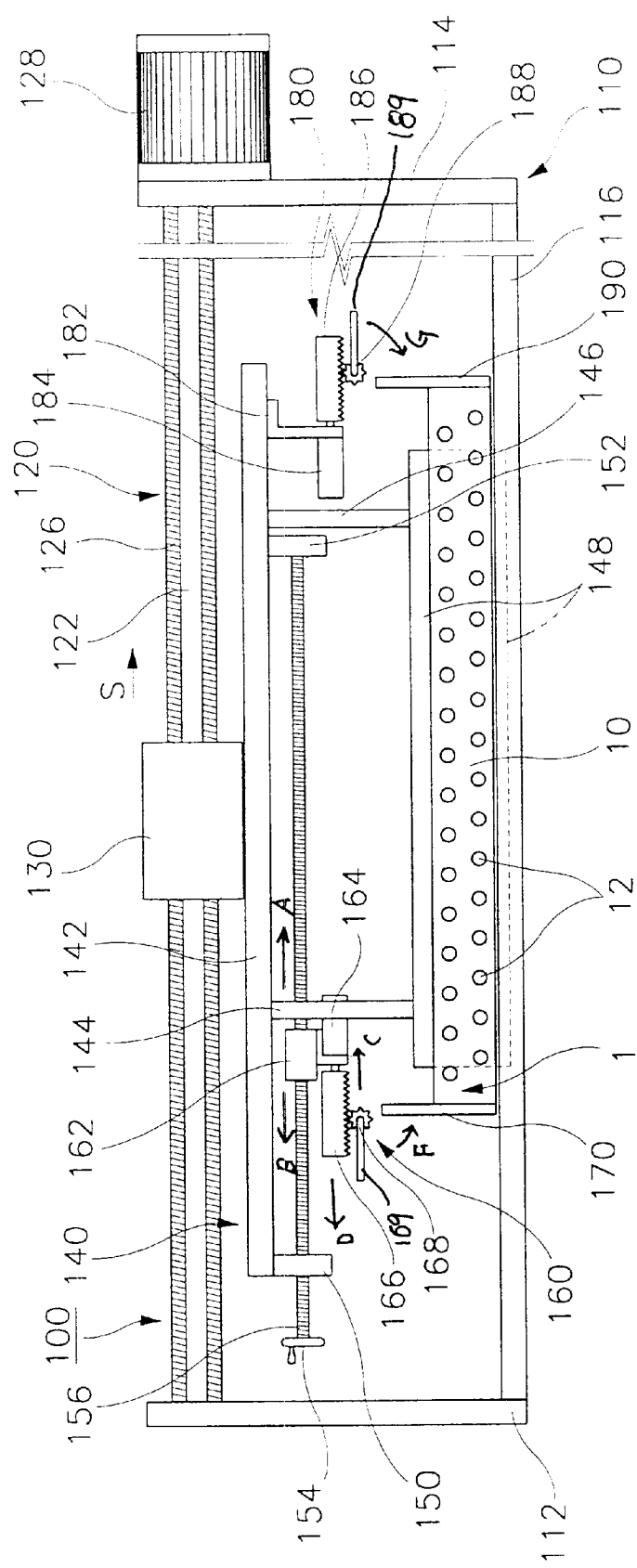
FIG. 2 is a plan view of an automatic assembling apparatus according to the principle of the present invention.
Figure 3:
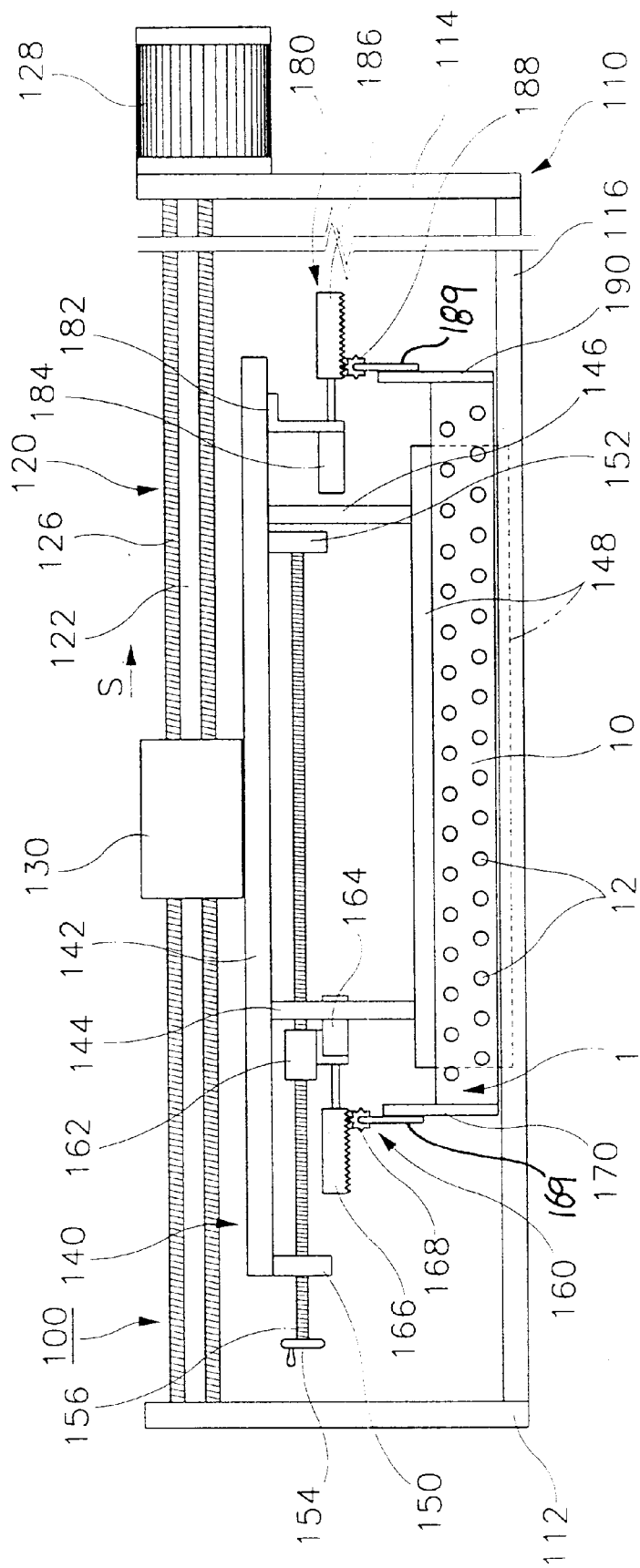
FIG. 3 is a plane view of an automatic assembling apparatus illustrating a clamping state of the heat exchanger of FIG. 2.
Figure 4:
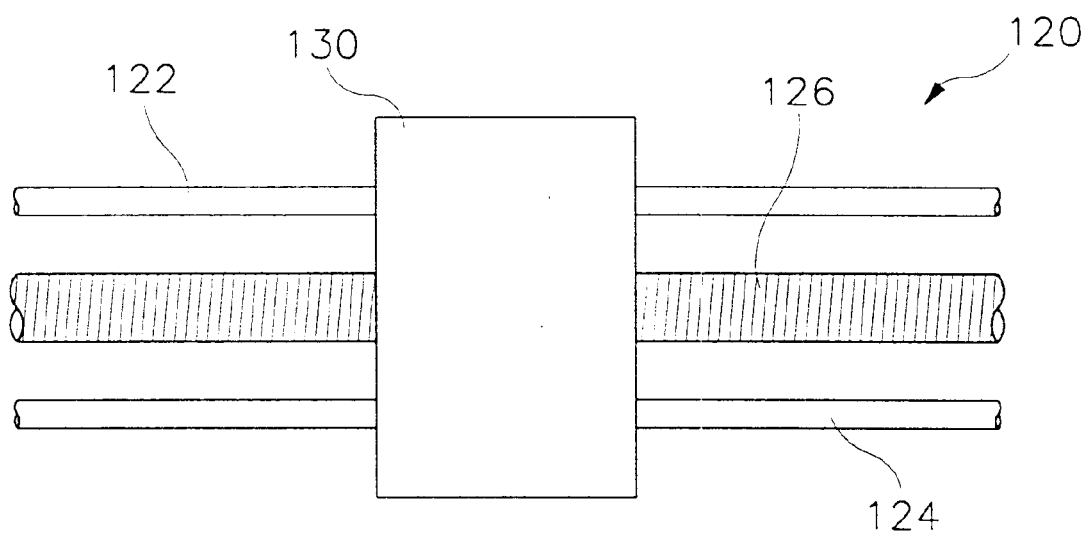
FIG. 4 is a front view of a heat exchanger transferring unit of FIG. 2.

As shown in FIGS. 2 through 4, the heat exchanger transferring unit 100 includes a supporting frame 110 forming external sides and connecting the heat exchanger transferring unit 100 to the return bend inserting unit 200, a transferring member 120 installed on a rear side of supporting frame 110 for horizontally transferring heat exchanger 1, and a clamping member 140 connected at and moved with transferring member 120 for clamping the heat exchanger 1 and maintaining heat exchanger 1 in a predetermined position where return bends 14 are arranged and inserted into hair pins of heat exchanger 1.

Supporting frame 110 includes first and second supporters 112, 114 installed on predetermined portions of both sides by a predetermined horizontal distance and spaced-apart from each other, and a connecting rod 116 connected to front upper ends of first and second supporters 112, 114 for maintaining first and second supporters 112, 114 in parallel.

Transferring member 120 includes first and second rail rods 122, 124 coupled to upper and lower portions of the rear end of first and second supporters 112, 114 of supporting frame 110 for being maintained in parallel, a first screw axle 126 disposed between the first and second rail rods 122, 124, rotatably mounted on first and second supporters 112, 114, and maintained in parallel with first and second rail rods 122, 124, a stepping motor 128 installed on an external side of second support 114 and rotating the first screw axle 126, and a first head block 130 supported by first and second rail rods 122, 124 and coupled to threaded portions of first screw axle 126 for moving along first and second rail rods 122, 124 and first screw axle 126.

Clamping member 140 includes a fixing plate 142 fixed on the front lateral surface of first head block 130 for moving along with first head block 130, a supporting pad 148 secured on fixing plate 142 via a plurality of supporting brackets 144, 146 by a predetermined distance from the front lateral side of the fixing plate 142 for transferring along with the fixing plate 142 and supporting the rear and lower sides of heat exchanger 1, a second screw axle 156 supported at the front lateral surface by a plurality of second axle supporting members 150, 152 protruded by a predetermined distance from the front lateral surface of the fixing plate 142, a knob 154 being mounted on one end of second screw axle 156 and rotating second screw axle 156, a transferring clamp 160 movably coupled to second screw axis 156 and moving in the direction of arrow A or B by the rotation of knob 154 and second screw axle 156 for clamping one lateral end of the heat exchanger 1, and a fixing clamp 180 secured to fixing plate 142 at a position where heat exchanger 1 is disposed between fixing member 180 and transferring clamp 160 which are spaced-apart from each other by a predetermined distance for clamping the other lateral end of the heat exchanger 1. Supporting pad 148 is bent to support the rear and lower sides of heat exchanger 1.

Second screw axle 156 rotates to move transferring clamp 160 against or from fixing member 180 and relative to fixing plate 142 in the direction of arrow A or B without any horizontal fluctuation because second screw axle 156 is rotatably supported by and mounted on axle supporting members 150, 152. Second screw axle 156 rotates by knob 154.

Transferring clamp 160 includes a second head block 162 connected to an external surface of thread portion of second screw axle 156 and moving in the direction of Arrow A or B, a cylinder 164 fixed on a front side of second head block 162, a first rack member 166 connected to one end of cylinder 164 for making reciprocal linear movements upon operations of the cylinder 164 in a direction of arrow C or D, a first pinion 168 rotatably coupled to second head block 162 and meshed with gear portions of first rack member 166 for rotating in a direction or reverse direction of an arrow F along with first rack member 166, and a clamp block 170 fixed on pinion 168 for simultaneously rotating along with first pinion 168 to clamp or releasing the one end of heat exchanger 1.

Fixing clamp 180 includes a cylinder 184 installed on one end of the front lateral side of fixing plate 142 via a fixing bracket 182, a second rack member 186 coupled to one end of cylinder 184 for reciprocally moving relative to fixing plate 142 in response to operations of cylinder 184, a second pinion 188 rotatably mounted on fixing plate 142 and meshed with gear portion of second rack member 186 for rotating in a direction or reverse direction of an arrow G, a clamp block fixed on second pinion for simultaneously rotating along with second pinion 188 to clamp or releasing the other end of heat exchanger 1. Clamp blocks 170, 190 are set up for rotating by sequential operations of cylinders 164, 184, first and second rack members 166,186 and first and second pinions 168,188 to clamp or releasing the each end of heat exchanger 1.

Figure 5:
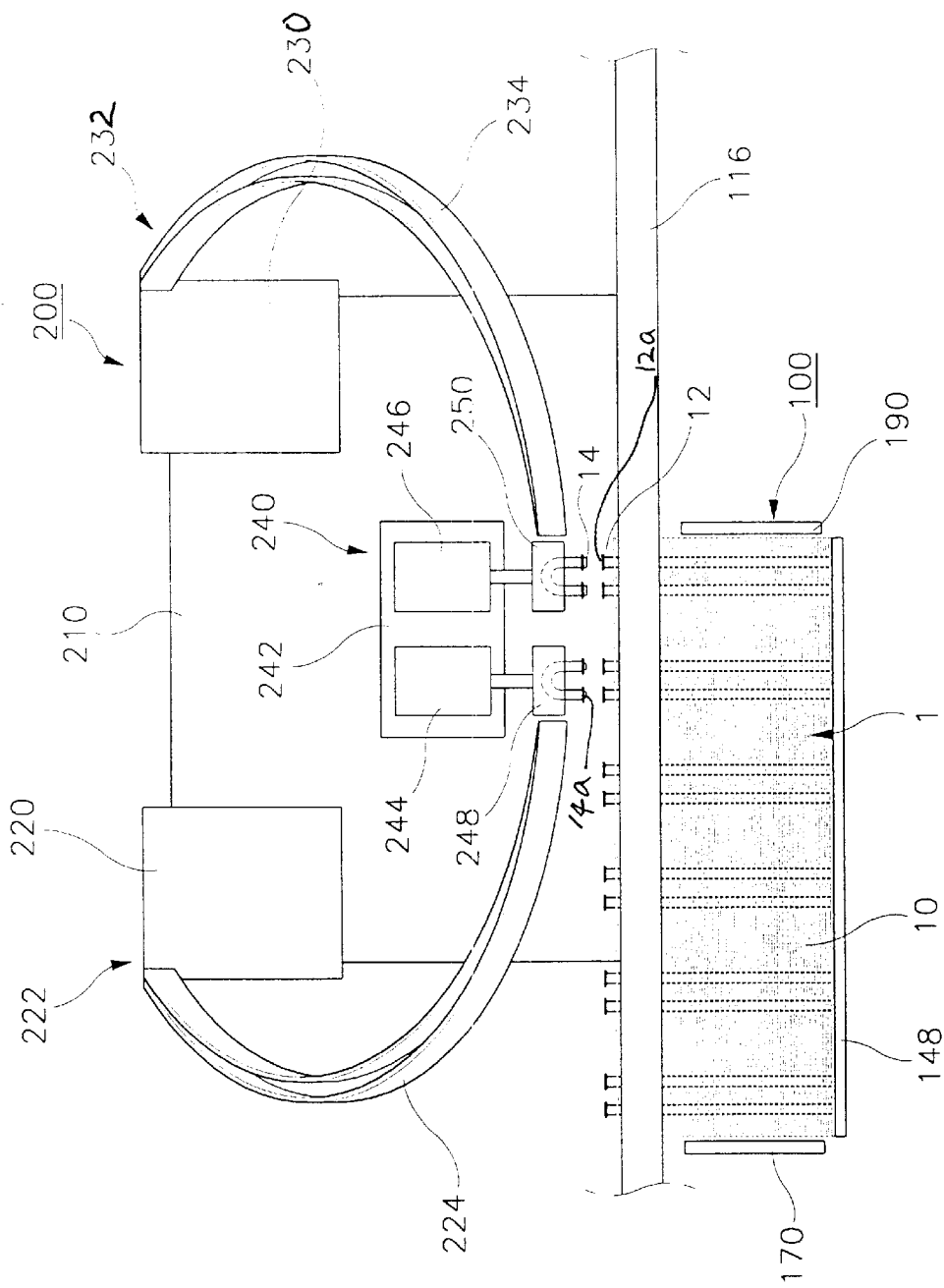
FIG. 5 is a front view of a return bend supplying unit of the automatic assembling apparatus according to the principle of the present invention.
Figure 6:
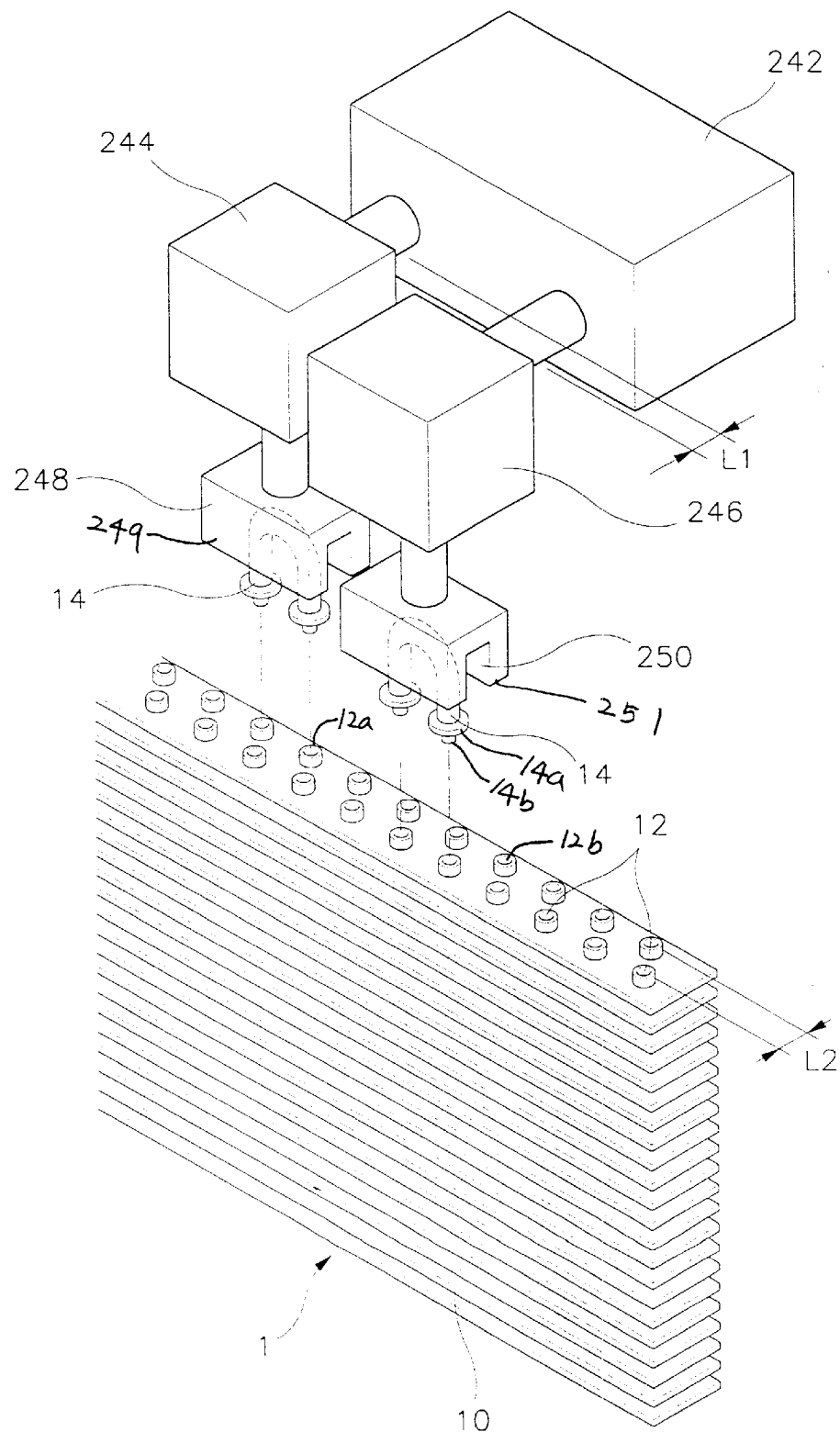
FIG. 6 is a perspective view of a return bend inserting unit of the automatic assembling apparatus according to the principle of the present invention.
Figure 7:
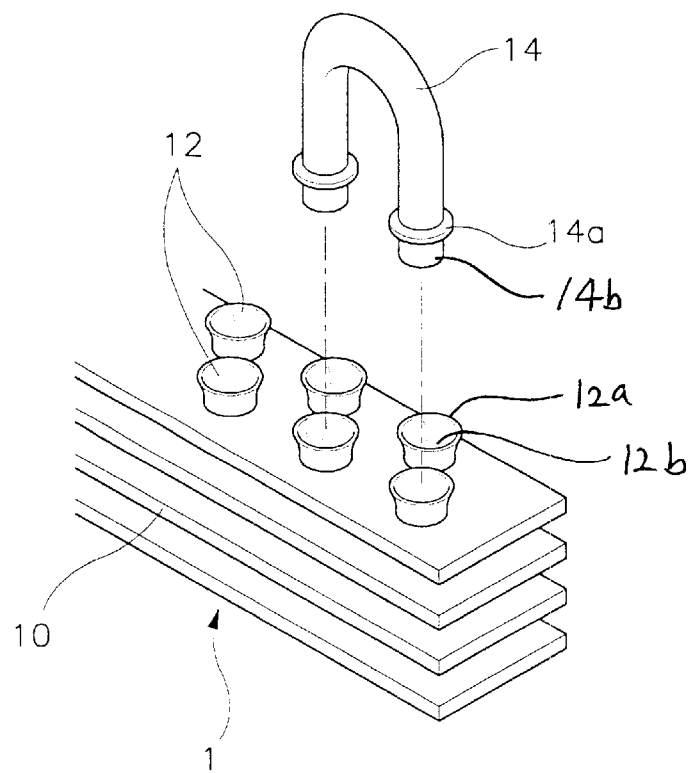
FIG. 7 is a perspective view illustrating an arrangement of the return bends and the hair pins of FIG. 6.
Figure 8:
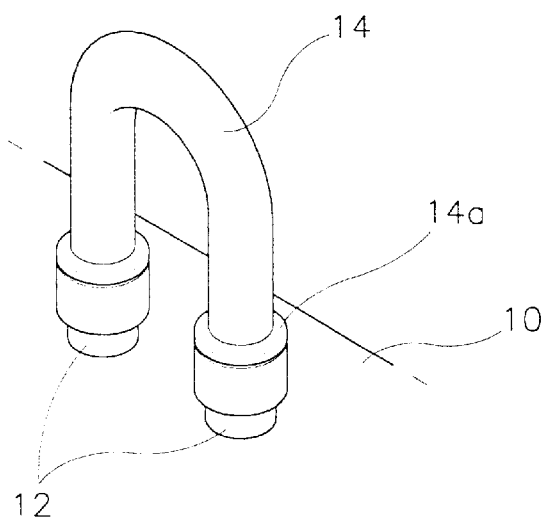
FIG. 8 is a perspective view illustrating an assembled state of the return bend and the hair pin of FIG. 7.

Referring to FIGS. 5 through 7, the bend inserting unit 200 includes a main body 210 for connecting the heat exchanger transferring unit 100 and the bend inserting unit 200, first and second return bend supplying member 220, 130 installed on both upper ends of main body 210 for simultaneously accommodating and supplying the return bends 14 one after another; and a bend inserting member 240 positioned at the center of the lower end of the front lateral surface of the main body for clamping the return bends respectively supplied from the first and second bend supplying members 220, 230 and tightly coupling return bends to hair pins arranged at two rows of heat exchanger 1. Bend inserting member 240 moves between a first position where first and second clamps 248, 250 pick up each return bend 14 and a second position where first and second clamp 248, 250 release each return bend 14 after return bends 14 have been inserted into hair pins 12.

First and second bend supplying members 220, 230 include hoppers 222, 232 separately attached to main body 210 for accommodating a plurality of return bends 14 through upper openings and arranging return bends 14 to be discharged with ends 14b directing downwards, and guide rail rods 224, 234 respectively adhered to upper ends of the hoppers 222, 232 through the return bend inserting member 240 and having upper portions opened to receive return bends 14 from hoppers 222, 232 and sequentially supply the arranged and discharged return bends 14 to bend inserting member 240. Guide rail rods 224, 234 forms a passageway between hopper 222, 232 and bend inserting member 240 as shown in FIG. 5.

Bend inserting member 240 includes a first cylinder 242 installed on main body by a predetermined height from the center of the front lateral surface of the main body 210, second and third cylinders 244,246 positioned on first cylinder 242 by a predetermined distance from both sides of the front lateral surface of the first cylinder 242 for respectively moving toward or from first cylinder 242, and first and second clamps 248, 250 installed on lower ends of second and third cylinders 244, 246 for respectively clamping return bends 14 supplied from the guide rail rods 224, 234 and fixedly inserting two ends of the clamped return bends 14 by a predetermined length into two ends of first and second rows of hair pins 12 arrayed in heat exchanger 1. first and second clamps 248, 250 are made to enlarge lower ends 249,251 in a predetermined width and pick up upper ends of return bends 14 supplied by guide rail rods 224, 234 when the second and third cylinders 244, 246 lifts up the first and second clamps 248, 250 by a predetermined height and to shrink lower ends 249,251 after catching return bends 14. A connecting rod is disposed to support the flat plate fins clamped by clamping unit and guide the insertion of return bend into hair pin.

Reference numeral 14a is a welding ring attached to outer circumferential surface of return bend 14. Welding ring 14a melts at a high temperature of heat and tightly seal a gap formed between ends 14b of return bend and ends 12a when ends 14b of return bend 14 are forcibly pressed into the inside 12b of hair pin 12.

The operations and effects according to the principle of the present invention will be described hereinafter. When heat exchanger 1 is placed on the supporting pad 148 as shown in FIG. 2, transferring clamp 160 and fixing clamp 180 are operated. Cylinders 164, 184 of fixing and transferring clamp 160, 180 operate to further move first and second rack members 166, 186 respectively connected to cylinders 164, 184. Then, first and second rack members 166, 168 rotate first and second pinions 168, 188 in one direction and rotate in the same direction clamp blocks 169, 189 coupled to pinions 168,188. Two clamp blocks 169, 189 are facing each other. As a result, guide plates 170, 190 clamp both lateral sides of heat exchanger 1 placed on supporting pad 148 as shown in FIG. 3.

Depending on a length of heat exchanger 1, transferring clamp 160 can be properly adjusted to clamp heat exchanger 1. For example, in response to rotation of the knob 154 mounted on the one end of second screw axle 156 in a clockwise or counter clockwise direction, second screw axle 156 connected to knob 154 and rotatably mounted on axle supporting members 150, 152 protruding from fixing plate 142 rotates in the same direction of knob 154, and second head block 162 coupled to the external surface of thread portion of second screw axis 156 moves in the direction of arrow A or B thereby moving the entire transferring clamp 160 in the same direction. As a result, transferring clamp 160 moves far from or close to the center of fixing clamp 180 to control the distance in accordance with the length of heat exchanger 1 and to adjust adherence when both ends of heat exchanger 1 are clamped by transferring clamp 160 and fixing clamp 180.

After the clamping process of the heat exchanger 1 is completed, a stepping motor 128 is driven in a clockwise or counter clockwise direction. First screw axle 126 rotates by stepping motor 128. As a result, first head block 130 slidably supported by rail road 122, 124 and meshed with the outer circumferential surface of thread portion of first screw axle 126 moves in the direction of arrow S as shown in FIG. 3. Accordingly, first head block 130 moves the clamping member 140 including transferring clamp 160, supporting pad 148, fixing clamp 180, and heat exchanger 1.

First head block 130 is located by stepping motor 128 at a position where the return bend is inserted after the hair pin 12 assembled with heat exchanger 1. Return bend 14 clamped by bend inserting member 240 are transferred to the same position. On the other hand, a plurality of return bends 14 are located into hoppers 222, 232 of the first and second bend supplying members 220, 230. In response to operation of vibration generating means not shown and connected to hoppers 222, 232, return bends 14 are sequentially pushed by vibrations from the hoppers 222, 232 to the guide rails 224, 234 and automatically arranged to have both ends 14b of return bend 14 directed downward to be further inserted into two ends 12a of hair pins 12.

First and second clamps 248,250 of bend inserting member 240 positioned at the outlet of the guide rails 224,234 clamp the upper bent portions of the arranged return bends 14. In response to operation of first cylinder 242 of bend inserting part 240, second and third cylinders 244,246 separately installed by a horizontal distance on the front side of first cylinder 242 simultaneously move forwards to automatically be positioned by a predetermined height corresponding to the outlets of guide rails 224,234 placed-apart from each other by a predetermined distance. In accordance with the operation of second and third cylinders 244,246, first and second clamps 248,250 are simultaneously lowered for respectively clamping the upper bent portions positioned at the outlet of the guide rails 224,234. First and second clamps 248,250 are lifted up to avoid interference with the guide rails 224,234 to positions by a predetermined height and by a predetermined distance corresponding to two ends 12a of hair pins 12 of heat exchanger 1 by second and third cylinders 244,246 following the operations of first cylinder 242.

As shown in FIG. 6, first clamp 248 automatically is positioned at a predetermined height corresponding to a predetermined distance from two ends 12a of hair pins 12 arranged at one row of the heat exchanger 1 according to a distance L1 between first cylinder 242 and second cylinder 244. Also, second clamp 250 automatically is positioned at a predetermined height corresponding to a predetermined distance from two ends 12a of hair pins 12 arranged at the other row of the heat exchanger 1 according to a distance L2 between the second and third cylinders 244,246 in addition to the distance L1 between the second and third cylinders 244,246. The distance between first cylinder 242 and third cylinder 246 is corresponding to a sum of first distance L1 and second distance L2. Second clamp 250 moves further from first clamp 248 by a second distance L2 to insert return bend into hair pin located on the other row while first clamp 248 is disposed to insert return bend 14 into hair pin 12 located on the one row.

Therefore, if first and second clamps 248,250 move downwards together, return bends 14 clamped at first and second clamps 248,250 are respectively inserted and fixed to two ends 12a of hair pins located on the first and second rows as shown in FIG. 6. If the lower ends 14b of return bend 14 are correspondingly inserted into two ends 12a of hair pins by a predetermined length as shown in FIG. 7, the external circumferential surface of the two ends 14a of return bend 14 are forcibly inserted into the inside 12b of the two ends of hair pins 12, thereby completing the process of inserting return bends 14 into hair pin 12.

Is Therefore, heat exchanger transferring unit 100 and bend inserting unit 200 automatically and simultaneously assemble a plurality of hair pins 12 and a plurality of return bends 14 and repeat the aforementioned assembling processes a number of times according to the preset program.

As described in the above, there are advantages in the automatic device for inserting return bends of the heat exchanger in the present invention in that it can automatically set up a position where return bends are to be inserted and fixed correspondingly to hair pins, when the return bends are fixedly inserted into the hair pins, thereby equalizing the height of fixed return bends, preventing wrong fixations to eliminate defects and reducing time in assembly for a mass production.

What is claimed is:

1. An automatic assembling apparatus in a heat exchanger, comprising:
   a frame having a bed and a pair of supporters;
   a heat exchanging unit having a plurality of flat plate fins and a plurality of hair pins;
   a clamping unit disposed on said bed, having a fixing clamp and a moving clamp, clamping said heat exchanging unit located between said fixing clamp and said moving clamp by moving said moving clamp against said fixing clamp;

a transferring unit installed between said supporters, connected to said clamping unit, moving said clamping unit to a place where a plurality of return bends are inserted into corresponding one of said hair pins; and a bend inserting unit disposed on said place and adjacent to said flat plate pins to align said return bends and said hair pins and insert said return bends into said corresponding one of said hair pins, said bend inserting unit having a container containing said return bends, first and second clamps clamping said return bends supplied from said container and simultaneously inserting said return bends into said corresponding one of said hairpins, and a plurality of guide rails disposed between said container and said first and second clamps to align supply of said return bends to said first and second clamps.

2. The apparatus of claim 1, with said bend inserting unit positioning said first clamp spaced-apart from a second clamp by a first distance corresponding to a space between first and second rows of said hair pins so as to simultaneously insert said return bends clamped by said first and second clamps respectively into said hair pins located on said first and second rows.

3. The apparatus of claim 1, with said bend inserting unit moving said first and second clamps between a first position where said first and second clamps pick up said return bends supplied through said guide rails and a second position where said first and second clamps insert said return bends into said hair pins.

4. The apparatus of claim 1, with said bend inserting unit comprising a first cylinder aligning said return bends clamped in said first and second clamps with said hair pins.

5. The apparatus of claim 4, with said bend inserting unit comprising second and third cylinders connected to said first and second clamps respectively, inserting said return bends clamped in said first and second clamps into said hair pins by a predetermined distance after said return bends clamped in said first and second have been aligned with said hair pins.

6. The apparatus of claim 1, with said transferring unit comprising:

a first screw axle rotatably mounted on said supporters; and a first head block slidably coupled to said first screw axle, moving along said axle while said axle rotates, coupled to said clamping unit, moving said clamping unit to said place.

7. The apparatus of claim 6, with said transferring unit comprising a motor coupled to said first axle and rotating said first screw axle about an axis passing through said first screw axle.

8. The apparatus of claim 6, with said transferring unit comprising a rail connected between said supporters, spaced-apart in parallel from said first screw axle, and supporting said first head block while said first head block moves along said first screw axle.

9. The apparatus of claim 1, with said clamping unit comprising a supporting pad secured to said transferring unit, supporting said flat plate fins located on said bed, guide said flat plate fins while said flat plate fins are clamped.

10. The apparatus of claim 9, with said clamping unit comprising:

a plate fixed to said first head block; and a supporting pad secured to said plate, supporting said flat plate fins located on said bed, guide said flat plate fins while said flat plate fins are clamped.

11. The apparatus of claim 9, with said clamping unit comprising:

a second screw axle rotatably mounted on said first head block; and a second head block slidably coupled to said second screw axle, moving along said second axle while said second axle rotates, coupled to said transferring clamp, moving said transferring clamp toward and from said fixing clamp.

12. The apparatus of claim 11, with said clamping unit comprising:

a clamp block rotatably coupled to said second head block, clamping said flat plate fins; and a second clamp block rotatably coupled to said transferring unit, clamping said flat plate fins.

13. An automatic assembling apparatus in a heat exchanger, comprising:

a frame having a bed and a pair of supporters secured to both sides of said bed;

a transferring unit coupled to said supporters, having a clamping unit clamping a plurality of fin members located on said bed, moving said fin members clamped in said clamping unit along said bed to a place where a plurality of bends are simultaneously inserted into corresponding one of a plurality of pins mounted in said fin members; and a bend inserting unit disposed on said place and adjacent to said fin members to insert said bends into said pins, said bend inserting unit having a container containing said bends, first and second clamps clamping said bends and inserting said bends into said corresponding one of said pins, and a plurality of guide rails disposed between said container and said first and second clamps to align supply said bends to said first and second clamps.

14. The apparatus of claim 13, with said clamping unit comprising a fixing clamp and a moving clamp, clamping said fin members having a plurality of pins mounted in said fin members and being located between said fixing clamp and said moving clamp by moving said moving clamp against said fixing clamp.

15. The apparatus of claim 13, with said bend inserting unit positioning said first clamp spaced-apart from a second clamp by a first distance corresponding to a space between first and second rows of said pins so as to simultaneously insert said bends clamped by said first and second clamps respectively into said pins located on said first and second rows.

16. The apparatus of claim 13, with said bend inserting unit moving said first and second clamps between a first position where said first and second clamps pick up said bends supplied through said guide rails and a second position where said first and second clamps insert said bends into said pins.

17. The apparatus of claim 13, with said transferring unit comprising:

a first screw axle rotatably mounted on said supporters; and a first head block slidably coupled to said first screw axle, moving along said axle while said axle rotates, coupled to said clamping unit, moving said clamping unit to said place.

18. The apparatus of claim 17, with said transferring unit comprising a rail connected between said supporters, spaced-apart in parallel from said first screw axle, and supporting said first head block while said first head block moves along said first screw axle.

19. The apparatus of claim 18, with said transferring unit comprising a rail connected between said supporters, spaced-apart in parallel from said first screw axle, and supporting said first head block while said first head block moves along said first screw axle.

* * * * *